United States Patent
Schwartz et al.

(10) Patent No.: US 10,511,620 B2
(45) Date of Patent: Dec. 17, 2019

(54) DETECTION OF VULNERABLE DEVICES IN WIRELESS NETWORKS

(71) Applicant: Armis Security Ltd., Tel Aviv (IL)

(72) Inventors: Tomer Schwartz, Tel Aviv (IL); Nadir Izrael, Tel Aviv (IL)

(73) Assignee: Armis Security Ltd., Tel-Aviv-Yafo (IL)

( * ) Notice: Subject to any disclaimer, the term of this patent is extended or adjusted under 35 U.S.C. 154(b) by 280 days.

(21) Appl. No.: 15/398,118

(22) Filed: Jan. 4, 2017

(65) Prior Publication Data
US 2018/0124096 A1 May 3, 2018

Related U.S. Application Data

(63) Continuation-in-part of application No. 15/339,229, filed on Oct. 31, 2016.

(51) Int. Cl.
| | |
|---|---|
| *H04L 29/06* | (2006.01) |
| *H04W 8/22* | (2009.01) |
| *H04W 12/08* | (2009.01) |
| *H04W 24/04* | (2009.01) |
| *H04W 24/08* | (2009.01) |
| *H04W 8/00* | (2009.01) |

(52) U.S. Cl.
CPC ........ *H04L 63/1433* (2013.01); *H04L 63/102* (2013.01); *H04L 63/1425* (2013.01); *H04W 8/22* (2013.01); *H04W 12/08* (2013.01); *H04W 24/04* (2013.01); *H04W 8/005* (2013.01); *H04W 24/08* (2013.01)

(58) Field of Classification Search
CPC ............... H04L 63/1433; H04L 63/102; H04L 63/1425; H04W 24/08; H04W 12/08; H04W 8/22
See application file for complete search history.

(56) References Cited

U.S. PATENT DOCUMENTS

| | | |
|---|---|---|
| 5,471,459 A | 11/1995 | Gut |
| 6,363,489 B1 | 3/2002 | Comay et al. |

(Continued)

FOREIGN PATENT DOCUMENTS

| | | |
|---|---|---|
| RU | 124102 U1 | 1/2013 |
| WO | 2015113036 A1 | 7/2015 |

OTHER PUBLICATIONS

The International Search Report and The Written Opinion for PCT/US2017/057830, ISA/RU, Moscow, Russia, dated Jan. 18, 2018.

(Continued)

*Primary Examiner* — John B King
(74) *Attorney, Agent, or Firm* — M&B IP Analysts, LLC

(57) ABSTRACT

A method and system for detecting vulnerable wireless devices operating in a wireless environment of an organization are provided. The method includes identifying a plurality of wireless devices operable in the wireless environment; for each identified wireless device: receiving intercepted traffic transmitted by the wireless device, wherein the intercepted traffic is transported using at least one type of wireless protocol; analyzing the received traffic to determine if the wireless device is vulnerable, wherein the analysis is performed using at least a profile generated for the wireless device; and generating an alert, when it is determined that the wireless device is vulnerable.

21 Claims, 6 Drawing Sheets

(56) References Cited

U.S. PATENT DOCUMENTS

| | | |
|---|---|---|
| 7,603,710 B2 | 10/2009 | Harvey et al. |
| 7,853,250 B2 | 12/2010 | Harvey et al. |
| 8,875,255 B1* | 10/2014 | Dotan .................... G06F 21/31 |
| | | 713/182 |
| 9,456,343 B1* | 9/2016 | Mihalache ............ H04W 12/06 |
| 10,015,185 B1* | 7/2018 | Kolman ............. H04L 63/1425 |
| 2004/0049699 A1 | 3/2004 | Griffith et al. |
| 2005/0002025 A1 | 1/2005 | Goto et al. |
| 2005/0188215 A1* | 8/2005 | Shulman ............ H04L 63/1416 |
| | | 713/188 |
| 2007/0142030 A1 | 6/2007 | Sinha et al. |
| 2008/0086776 A1 | 4/2008 | Tuvell et al. |
| 2009/0235354 A1 | 9/2009 | Gray et al. |
| 2011/0046920 A1 | 2/2011 | Amis |
| 2013/0227689 A1 | 8/2013 | Pietrowicz et al. |
| 2014/0241373 A1 | 8/2014 | Pasam et al. |
| 2014/0247728 A1 | 9/2014 | Amitai et al. |
| 2014/0282905 A1 | 9/2014 | Iyer et al. |
| 2014/0283029 A1 | 9/2014 | Chandrasekaran et al. |
| 2015/0113133 A1 | 4/2015 | Srinivas et al. |
| 2015/0128236 A1* | 5/2015 | Moscicki ............ H04L 63/0876 |
| | | 726/7 |
| 2015/0339912 A1 | 11/2015 | Farrand et al. |
| 2015/0350228 A1 | 12/2015 | Baxley et al. |
| 2015/0350902 A1 | 12/2015 | Baxley et al. |
| 2016/0112878 A1 | 4/2016 | Kaushik |
| 2017/0063906 A1 | 3/2017 | Muddu et al. |
| 2017/0180384 A1* | 6/2017 | Malenfant ............ H04L 63/102 |
| 2017/0257363 A1* | 9/2017 | Franke ................ H04L 63/0853 |
| 2018/0097840 A1* | 4/2018 | Murthy .................. H04L 63/02 |

OTHER PUBLICATIONS

The International Search Report and the Written Opinion of the International Searching Authority for PCT/US2017/057832, ISA/RU, Moscow, Russia, dated Mar. 22, 2018.

* cited by examiner

| Attribute | Value |
|---|---|
| Vendor (manufacturer) | |
| Device Type | |
| Device version | |
| Device name | |
| Device ID | |
| User name | |
| MAC Address$_1$, ..., MAC address$_n$ | |
| Firmware Version | |
| Supported wireless protocols | |
| OS type and version | |
| User Identifier | |
| Profile last update | |
| Legitimate | <Yes, No> |
| Aging | |
| Network location(s) | |

FIG. 2

DETECTION OF VULNERABLE DEVICES IN WIRELESS NETWORKS

CROSS-REFERENCE TO RELATED APPLICATIONS

This application is a continuation-in-part of U.S. patent application Ser. No. 15/339,229 filed on Oct. 31, 2016, the contents of which are hereby incorporated by reference.

TECHNICAL FIELD

The present disclosure generally relates to cybersecurity systems, and more particularly to detection of vulnerable devices coexisting in a secured environment.

BACKGROUND

Cybersecurity is the protection of information systems from theft or damage to the hardware, to the software, and to the information stored in them, as well as from disruption or misdirection of the services such systems provide. Cybersecurity is now a major concern for virtually any organization, from business enterprises to government institutions. Hackers and other attackers attempt to exploit any vulnerability in the infrastructure, hardware, or software of the organization to execute a cyber-attack.

The ever-increasing utilization of wireless devices and wireless networks poses a real threat to any organization due to vulnerabilities of such devices. Practically any electronic device is now connected to the internet over a wireless connection, thereby rendering communications susceptible to interception or interference. Furthermore, in a typical organization, many wireless networks coexist, where each such network may be secured or unsecured. An attacker can access a wireless device or a different network through almost any wireless network or wireless connection (e.g., a Bluetooth® connection).

Another factor that increases the vulnerability of an organization is the fact that employees or guests often want to use their own devices to access data, some or all of which may be sensitive data. This type of data access using personal devices is typically referred to as bring your own device (BYOD). Of course, devices not setup specifically for the organization can put the organization's sensitive business systems and data at further risk.

As an example, a recent vulnerability in FitBit® fitness trackers may result in infection of nearby devices with malware over a Bluetooth® connection. Currently, cyber-attacks over Bluetooth® require an attacker to be in physical proximity (e.g., within a few meters) of a target device. The infecting malware can be delivered just seconds after connection of devices and, as a result, even fleeting proximity can be a problem. Thus, an employee with an infected FitBit® fitness tracker can unintentionally infect other devices in the organization with malware by connecting the infected FitBit® tracker to other devices. The employee's device could have been exploited by a hacker, for example, on a subway ride.

To secure their systems, infrastructure, and services, organizations utilize many different security products. A typical organization network is protected by products such as firewalls, anti-virus software, malware detection software, authentication and authorization systems, intrusion detection, anti-phishing systems, network and end behavior analysis, data leak prevention systems, web application firewalls (WAFs), and so on.

Typically, such products are utilized to detect, mitigate, or both detect and mitigate known vulnerabilities or threats. As an example, an enterprise network can implement one security product for an intrusion detection system (IDS) and another product for detecting malware downloaded by a remote resource that is sent to a secured resource in the organization over the Internet. The defense provided by an IDS is limited to the internal (and monitored) networks, but cannot be utilized to detect intrusion to and from unmonitored networks such as, e.g., wireless networks co-existing in the wireless environment of the internal network.

As another example, a conventional data leak prevention system can detect a sensitive document sent to an end-point over the Internet. However, such a system cannot detect a sniffer that traps any document sent to a wireless printer in the organization. As another example, a conventional data leak prevention system cannot detect a legitimate device in a network that transmits sensitive information to vulnerable device connected in the same network.

The aforementioned shortcomings are due to the fact that existing security solutions are designed to scan wireless activity by any wireless network, wireless activity in the protected organization, or both. Specifically, existing security solutions operate at the network layer (layer 4) or the application layer (layer 7) to detect anomalies. Thus, such solutions are completely agnostic to interconnectivity through wireless communications. Further, such existing security solutions are typically not designed to monitor activity of devices that are legitimately connected to a protected organization's infrastructure or network.

Another challenge posed by the myriad of wireless devices that may connect to an organization's infrastructure or network is that software and firmware are frequently updated. For example, a typical smartphone is updated regularly with a release of new software updates for an operating system (OS) and, for each application installed thereon, at least annually. Thus, trying to profile such devices may be an inefficient task.

The challenge involved with profiling a network device is magnified by the fact there is no industry standard for querying and/or obtaining information from user devices, network devices, and so on.

It would therefore be advantageous to provide a cybersecurity solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for detecting vulnerable wireless devices operating in a wireless environment of an organization. The method comprises identifying a plurality of wireless devices operable in the wireless environment; for each identified wireless device receiving intercepted traffic transmitted by the wireless device, wherein the intercepted traffic is transported using at least one type of wireless protocol; analyzing the received traffic to determine if the wireless device is vulnerable, wherein the analysis is performed using at least a profile generated for the wireless device; and generating an alert, when it is determined that the wireless device is vulnerable.

Some embodiments disclosed herein also include a system for detecting vulnerable wireless devices coexisting in a wireless environment of an organization. The system comprises a processing circuitry; and a memory; the memory containing instructions that, when executed by the processing circuitry, configure the system to identify a plurality of wireless devices operable in the wireless environment; for each identified wireless device: receive intercepted traffic transmitted by the wireless device, wherein the intercepted traffic is transported using at least one type of wireless protocol; analyze the received traffic to determine if the wireless device is vulnerable, wherein the analysis is performed using at least a profile generated for the wireless device; and generate an alert, when it is determined that the wireless device is vulnerable.

Some embodiments disclosed herein also include a non-transitory computer readable medium having stored thereon instructions for causing one or more processing units to execute a process for detecting vulnerable wireless devices coexisting in a wireless environment of an organization. The process comprises identifying a plurality of wireless devices operable in the wireless environment; for each identified wireless device receiving intercepted traffic transmitted by the wireless device, wherein the intercepted traffic is transported using at least one type of wireless protocol; analyzing the received traffic to determine if the wireless device is vulnerable, wherein the analysis is performed using at least a profile generated for the wireless device; and generating an alert, when it is determined that the wireless device is vulnerable

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 2 is an example device profile generated according to an embodiment.

DETAILED DESCRIPTION

Figure 1:
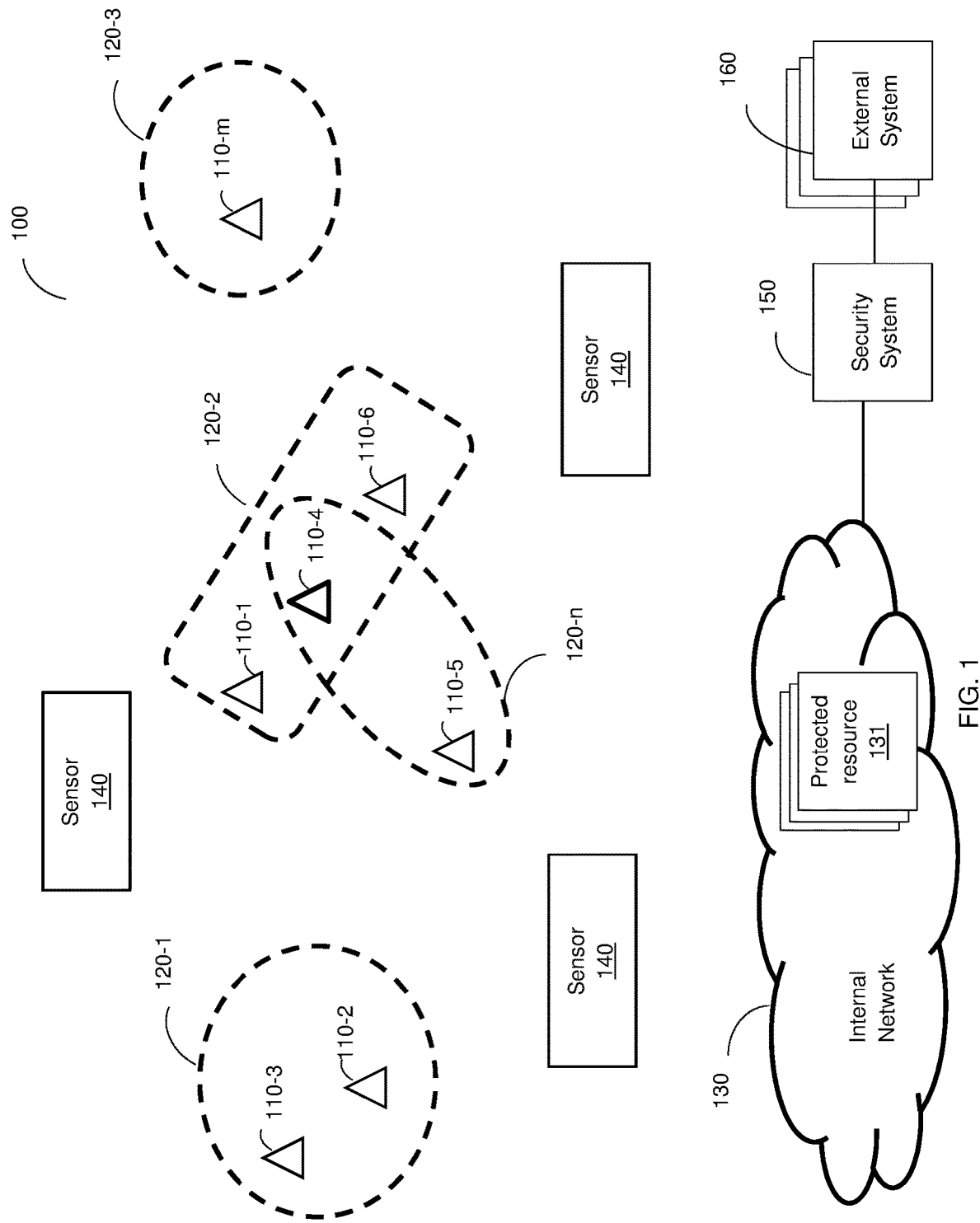
FIG. 1 is a diagram of a wireless environment utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example network diagram of a wireless environment 100 utilized to describe the various disclosed embodiments. The wireless environment 100 includes a plurality of wireless devices 110-1 through 110-*m* (hereinafter referred to individually as a wireless device 110 and collectively as wireless devices 110, merely for simplicity purposes) and a plurality of coexisting wireless networks 120-1 through 120-*n* (hereinafter referred to individually as a wireless network 120 and collectively as wireless networks 120, merely for simplicity purposes), thereby allowing communication between and among the wireless devices 110. Also, operable in the wireless environment 100 is an internal network 130 of an organization. The internal network 130 includes protected resources 131. Such protected resources 131 may include, but are not limited to, servers, computers, databases, services, applications, data, and the like.

Each wireless device 110 may be, but is not limited to, a laptop, a PC, a smartphone, an IoT device, a wearable device, a peripheral device (e.g., a printer, a mouse, a keyboard, a speaker, etc.), an appliance, a remote controller, a wireless router (access point), or any other electrical or electronic device that can communicate over a wireless network.

The wireless network 120 can facilitate communication using wireless communication protocols including, but not limited to, Wi-Fi, nRF, cellular communication protocols (e.g., LTE, 2G, 3G, 4G, etc.), Bluetooth®, Wi-Gi, Zigbee, Z-Wave, 5 Bluetooth low energy (BLE), EnOcean, DECT, 6LoWPAN, and the like. It should be noted that application layer protocols can communicate over such wireless protocols. Examples for application layer protocols include, but are not limited to, AirDrop®, HTTP, SMB, NTLM, OBEX, and the like.

According to the disclosed embodiments, a plurality of sensors 140-1 through 140-*p* (hereinafter referred to individually as a sensor 140 and collectively as sensors 140, merely for simplicity purposes) and a security system 150 are deployed in the wireless network 100. Each sensor 140 is deployed as an out-of-band device and configured to monitor and control the wireless traffic transmitted by the wireless devices 110 in proximity of where the sensor 140 is deployed. In some embodiments, a sensor 140 can be deployed as a device connected in the wireless network 100, as a passive device that merely listens to the traffic, or as a tap device.

Each sensor 140 is configured to process the monitored traffic based on a corresponding wireless communication protocol. For example, if the monitored traffic is transmitted over a Bluetooth® connection, the sensor 140 is configured to extract data as carried by the Bluetooth® protocol through its entire stack. Such data may include headers and payload data required to determine, for example, if a new connection is established, if an existing connection is identified, a type of data being transmitted, or a combination thereof. Thus, each sensor 140 is configured to process stack (all or some of the layers) of each wireless protocol supported by the sensor 140. Examples for such wireless protocols are mentioned above. In an embodiment, each sensor 140 can handle at least one type of wireless protocol.

As an example, a sensor 140 can sniff traffic transmitted between two wireless devices 110 over a secured Wi-Fi network (e.g., the network 120-1). To extract the protocol-data, the sensor 140 is required to decrypt the data being transmitted over the air. To this end, according to an embodiment, the passphrase of the Wi-Fi network is uploaded to and stored in the sensor 140. Using the passphrase, the sensor 140 can act as a passive device configured to listen to data traffic over the Wi-Fi network and decrypt any data traffic transported between the devices (e.g., the wireless devices 110-3 and 110-2 in the network 120-1).

Specifically, when a new wireless device 110 connects to the Wi-Fi network, a key exchange protocol is performed between the access point and the new device. The sensor 140 is configured to capture this communication. In an example implementation, the key exchange protocol is a 4-way handshake process that is a double-sided challenge-response designed to verify that both parties can derive the same encryption key without ever sending the key directly. The process can be performed for mutual authentication. Upon capturing the authentication packets, the sensor 140 is configured to derive, using the preconfigured passphrase, the same key just like the new wireless device 110. The keys are utilized to decrypt and encrypt any traffic transported between the new wireless device 110 and an access point.

A sensor 140 is also configured to capture BLE communications between two paired wireless devices 110 and to extract protocol-data. To discover the encryption key, the passkey entry (e.g., 6 digits when a passkey entry pairing procedure is utilized) is guessed or preconfigured either by the sensor 140 or the system 150. For example, the passkey entry can be guessed by trying all possible options of a 6-digit code. In an embodiment, the guessing of the passkey entry is performed by the security system 150. Using the discovered passkey entry and captured handshake, the encryption key can be derived for the session based on the BLE key exchange procedure. Using that encryption key, the communication between two BLE devices 110 can be decrypted and the protocol-data is extracted.

In another embodiment, the sensor 140 can extract traffic parameters by querying network devices (not shown) installed or deployed in the environment 100. For example, the sensor 140 can query a wireless access point about new connections being established and the wireless devices that participated in such establishments of connections. For example, a network device can be queried on the type of connection being established, the protocol type, the wireless devices participated in the connection, when the connection was established, and so on. In yet another embodiment, the sensor 140 can query the wireless devices 110 to retrieve information about a particular wireless device 110. For example, the vendor and current OS type of the wireless device 110-2 can be retrieved by querying the wireless device 110-2. This is performed in part during a proactive profiling discussed below.

The data extracted by each sensor 140 is sent to the security system 150 for further analysis. In some embodiments, data that can be utilized to profile devices, to detect vulnerable devices, or both, is sent to the security system 150. In another embodiment, data that can be utilized to detect vulnerable networks is also sent to the security system 150. For example, when the sensor 140 identifies a new wireless connection, data associated with the new wireless connection is sent to the security system 150.

The information utilized to profile a network device is processed by the sensor 140, the security system 150, or both. In an embodiment, for example, the sensors 140 can identify MAC addresses in traffic transported over the air. The MAC addresses are sent to the security system 150, which correlates the addresses to identify a single device that is associated with two or more MAC addresses. A MAC address can also provide an indication of a vendor for a given device. Determination of a device's vendor based on the MAC address may be performed by the sensors 140 or by the security system 150.

It should be noted that the information provided by the sensors 140 to the system 150 may be decrypted and may contain relevant information for analysis by the system 150. For example, such information may include network addresses (e.g., IP addresses, URLs, port numbers, etc.) accessed by a wireless device 110. The information may include data being accessed or transferred by a wireless device 110. For example, the contents of a Word document transferred from a wireless device 110 to a location in or outside the wireless environment would be provided to the security system 150.

In an embodiment, the sensor 140 is also configured to perform at least one mitigation action under the control of the security system 150. For example, the sensor 140 can terminate a wireless connection with a wireless device 110 determined to be vulnerable.

Each sensor 140 may be realized as a physical appliance, a virtual appliance (executed by a processing system), or a combination thereof. Examples for virtual appliance implementations include, but are not limited to, a virtual machine, a micro-service, a software agent, and the like.

The security system 150 may be deployed in a datacenter, a cloud computing platform (e.g., a public cloud, a private cloud, or a hybrid cloud), on-premises of an organization, or in a combination thereof. The security system 150 or functions thereof may be embedded in one or more of the sensors 140.

In an example deployment, the security system 150 is configured to interface with one or more external systems 160. Examples for such external systems 160 may include, but are not limited to, an active directory of the organization utilized to retrieve user permissions, access control systems, SIEM systems utilized to report on detected vulnerabilities, or other devices that can feed the security system 150 with potential threats or known vulnerabilities. The external systems 160 may further include an inventory management system, an identity management system, an authentication server, and the like.

The security system 150 is configured to detect wireless devices 110 that do not belong to the organization which may perform malicious activity, and thus may pose a risk to devices and networks in the wireless environment 100. Without limiting the scope of the disclosed embodiments, such devices will be referred to as vulnerable devices. In an embodiment, the detection is performed in part based on data extracted by and received from the sensors 140. The security system 150 is configured to profile each wireless device 110 discovered in the wireless environment 100. The profiling of devices is performed in part to determine if a device is a legitimate device. According to the disclosed embodiments, the security system 150 is configured to create a list of legitimate devices and a list of "unknown devices". A legitimate device is a wireless device 110 that is authorized to access the internal network 130 or any protected resource 131. An unknown device is a wireless device 110 that cannot be identified as a legitimate device.

A risk score is determined for each device 110 (both unknown and legitimate) detected in the environment 110. The risk score is determined based on activities performed by the device and the profile of the device. The activities may relate to the type of the detected vulnerability, the internal resources being accessed, the type of data being exploited, the type of data being transmitted by the device, a device type, a connection type, or any combination thereof.

In order to discover new wireless devices 110, the sensors 140 detect any new wireless connections being established in the wireless environment 100. For example, any new connection established with an access point (e.g., over a Wi-Fi network) or with another device (e.g., a Bluetooth® connection) is detected. Alternatively or collectively, wireless devices 110 can be detected when devices are disconnected from the network. For example, if the wireless device 110 detects a probe request from a Wi-Fi network or a page request in a Bluetooth network, such requests are indicative of a disconnected device. The wireless device 110 that initiated such requests is a discovered device.

At least a unique identifier of a device that initiated the connection is extracted or determined. Based on the value of the extracted unique identifier, it is determined if the device was already discovered. The unique identifier may include, but is not limited, to a MAC address. A list of previously discovered devices can be managed in a centralized location (e.g., the system 150) or distributed among the various sensors 140.

It should be noted that the unique identifier is not always available upon discovering a new wireless device 110. For example, Bluetooth piconets, slave devices, and the like are identified without having knowledge of their MAC addresses. In such cases, the unique identifier may be a temporary slot address assigned by a master device to the slave device. Using the temporary slot address. The MAC address of the slave device can be extracted at a later time.

The vendor of any newly discovered wireless device 110 is also derived from the MAC address based on the organizationally unique identifier (OUI). This vendor (manufacturer) name is added to a profile of the newly discovered wireless device 110. The profiling of a device can be performed passively, proactively, or both. Passive profiling of a wireless device 110 includes monitoring any traffic from and to the device, and particularly when the device establishes new connections. In an embodiment, any MAC addresses identified for the devices are correlated to determine if they belong to the same device and to the same type of device. For example, when Wi-Fi and BLE connections are established, two different MAC addresses are identified (one for each type of connection). If the same addresses are identified at any time that a wireless device 110 is connected to the networks, such addresses are associated with the same wireless device 110. Further, based on the values of the MAC addresses, the type of the wireless device 110 can be determined. For example, certain vendors may assign consecutive MAC addresses to NICs in the wireless device 110, thus upon detection of such addresses, the type of the wireless device 110 can be identified. Further, devices with multiple NICs can be distinguished from devices with a single NIC, e.g., a laptop computer versus a smartphone.

In a further embodiment, the proactive profiling may also include correlating between two devices to determine if they belong to the same user. For example, if a laptop computer is identified with a specific user and a sensor 140 detects a pair of Bluetooth® headphones always or frequently connected to the laptop, a profile of the Bluetooth® headphones will be updated with the user of the user name.

The proactive profiling may also include accessing a device through a designated port known to be open. For example, port number 62078 is an open port for iPhone® devices. To this end, a sensor can send a ping request through the designated port, which may be different than port number 62078. If the wireless device 110 responds to the ping request, the type of the wireless device 110 is determined. The proactive profiling may also include querying a wireless device 110 to retrieve the device characteristics, such as type (e.g., iPhone®), version (e.g., iPhone® 5), a firmware version, installed applications, networks the device is adapted to utilize, shared resources, an OS version, and the like. The proactive profiling may also include querying an active directory of the organization to identity a user of an identified wireless device 110.

An example device profile 200 is depicted in FIG. 2. The profile 200 lists some of the device attributes that can be learnt passively or proactively.

It should be noted that the device profile 200 shown in FIG. 2 merely shows example attributes, and that other attributes may be included in the profile without departing from the scope of the disclosure. It should be further noted that not all attributes should be learnt in order to utilize the profile. As noted in Table 1, the profile may include an aging field to determine when the profile is invalid (i.e., the contents of the profile are too old).

A wireless device 110 is determined as a legitimate device by monitoring its activity over time. In an embodiment, a wireless device 110 that authenticates to a wireless connection of the internal network 130 may be considered as a legitimate device. For example, an employee smartphone connected to a Wi-Fi of the organization over a secured connection may be added to the list of legitimate devices. In another example, a list of legitimate devices can be retrieved from an external system (e.g., an active directory of the organization). It should be noted that any legitimate device may be a protected using computing resource of the organization.

In another embodiment, prior to designating a device as legitimate, the device is first checked to detect at least known vulnerabilities, potential vulnerabilities, or both. For example, a virus scan can be performed prior to designating a wireless device 110 as a legitimate device. As yet another example, if a device is not installed with the recent security patch, such a device may not be designated as a legitimate device included in the list. In an embodiment, a list of legitimate devices is populated and may be saved in a database (not shown) or in the security system 150.

In an embodiment, the activity of each identified wireless device is monitored to detect if any potential malicious activity is performed. The detection is performed based on one or more investigation functions. In an embodiment, one investigation function includes identifying a connection to an IP address outside of the organization. Such a connection may be through a bridge from another wireless device 110. The source (services or system) of the IP address is analyzed to determine if such a source is vulnerable. For example, if the IP address is associated with a known cloud service, then the source is safe. Otherwise, if the source is unknown or related to a known attack tool, then the activity of the wireless device is flagged as malicious. If the wireless device 110 accessed a malicious source, a risk score of the wireless device is set, for example, to a high value (e.g., a value above a predetermined threshold).

An investigation action may include, but is not limited to, classifying the data transmitted by the device. The classification is performed to determine if at least sensitive information is transmitted to the unknown device. To this end, any payload data in the protocol-data is gathered and classified using a data loss prevention (DLP) service. Such a DLP service can be integrated in the security system 150 or one of the external systems 160. Typically, a DLP service is designed to detect certain data patterns indicative of the type of data.

If the transmission of sensitive information is detected, the risk score of the wireless device is set, for example, to a high value (e.g., a value above a predetermined threshold). Sensitive information may include any type of information that is predefined as valuable or confidential for the organization.

Another investigation action includes analyzing a usage pattern of a wireless device. The usage pattern may include time periods that the wireless device transmitted the information, amounts of data being transmitted at different time intervals, and so on.

An anomaly is determined based on the usage patterns. The anomaly may be determined further based on baselines for the usage patterns. A baseline for a usage pattern can be derived, for example, based on previous communications of the same wireless device; the usage in the organization of all or similar devices; similar activity of the same device type as recorded in a lab setting or in previous observations from other networks.

Following are some examples for detecting anomalies based on the usage patterns. An instance in which a smart-watch remains connected to the laptop, thereby maintaining an active connection when the office is closed (e.g., at night time), would be considered as an anomaly. This is due to the fact that a user of the smart-watch is not present at the office at that time. That is, the wireless network is active when it should not be active.

As another example, the volume of traffic typically transmitted by the smart-watch may be low (e.g., 100 KB) at a particular time interval. When it is detected that the smart-watch transmits a high volume of data (e.g., 1 GB) during the time interval, such a transmission would be considered as an anomaly. When a usage pattern type of anomaly is detected, the risk score of the device is set, for example, to a high value.

Another investigation action includes analyzing the profile generated for the a wireless device to determine its level of vulnerability. As noted above and illustrated in the FIG. 2, such a profile lists attributes of a wireless device as learnt over time. As an non-limiting example, if the analysis of the profile may include determining if the wireless device is installed with an OS version known to be vulnerable, the wireless device is determined as a risky device and the risk score will be set accordingly. As yet another example, if the wireless device acknowledges any connection request or ping, the wireless device is determined as a risky device and the risk score will be set accordingly.

In another embodiment, the risk score of a device is determined based on its active wireless connection. Specifically, in this embodiment, the activity of each wireless device 110 in the legitimate list is monitored to determine if the wireless device 110 is connected to, or forms a wireless network 120 (a network outside of the organization). A wireless network 120 can be formed through a connection to a different wireless device 110 that may be a legitimate or unknown device.

The security system 150 is configured to detect if any of the wireless networks 120 is vulnerable based on data extracted by and received from the sensors 140, and hence if there are any potential vulnerable networks including a group (i.e., two or more) of wireless devices 110 or a single connected device 110.

In an embodiment, the security system 150 is configured to determine, based on data received from the sensors 140 when the wireless network 120 connects to the internal network 130, when the wireless network 120 accesses a protected resource 131, or both. In a further embodiment, when such a connection or access is determined, the security system 150 may be configured to consider the wireless network 120 as a vulnerable network.

Alternatively or collectively, the security system 150 is configured to determine if the wireless network 120 bridges between the internal network 130 and a resource (not shown) external to the environment 100. For example, such an external resource may be a command-and-control server, a drop zone or end-point, and the like. In an embodiment, if it is determined that the wireless network 120 bridges between the internal network 130 and an external resource, the security system 150 may be configured to determine the wireless network 120 as being vulnerable.

Alternatively or collectively, the security system 150 is configured to determine if the wireless network 120 is an unknown network or if any device 110 connected in the wireless network 120 performs malicious activity. Malicious activity may include, for example, trafficking sensitive information, any activity that matches a known attack pattern, abnormal activity, or a combination thereof. It should be noted that an attack pattern may be indicative of a malicious activity when the device initiates the attack or is a target of the attack. In an embodiment, if it is determined that the wireless network 120 is an unknown network or that the device 110 performs malicious activity, the security system 150 may determine the wireless network 120 as vulnerable. An unknown network is a network that is not part of the IT infrastructure of the organization.

In an embodiment, the security system 150 is configured to determine a risk factor for each wireless network 120 determined to be suspicious or vulnerable. The risk factor is based on, for example, the type of the detected vulnerability, the internal resources being accessed, the type of data being exploited, a device type, a connection type, any combination thereof, and so on. An example embodiment for detecting a vulnerable wireless network in a wireless environment is disclosed in the above-referenced U.S. patent application Ser. No. 15/339,229, assigned to the common assignee, which is hereby incorporated by reference.

The risk score of a wireless device 110 is also determined based on its participation in a network 120 determined to be vulnerable. If a wireless device 110 is part of a wireless network, its risk score of the wireless device is set, for example, to a high value (e.g., a value above a predetermined threshold).

The risk score determined by any investigation action may be a numerical number (e.g., a number ranging from 0 to 10, where 10 is the highest risk), a deterministic value (e.g., low, medium, high), and the like. In certain embodiments, the risk score is stored together with the reason or reasons leading to the score. This provides the user with an additional layer of data, thereby allowing the user track to the cause for the vulnerability and allowing for mitigation of any detected vulnerability based on its specific cause or originator.

A global risk score may be computed for each wireless device 110. The global risk score may be a function of the various risk scores. Such a function may be, but is not limited to, an average, a weighted average, and the like. In some embodiments, different weights are assigned to legitimate devices than to unknown devices, as legitimate devices are less risky. In an embodiment, when the global risk score is over a predefined threshold, a wireless device 110 is determined as a vulnerable device. In some embodiments, a decision to perform a mitigation action is based on the determined risk score.

In an embodiment, upon determining the wireless device 120 as vulnerable, the security system 150 is configured to perform or initiate a mitigation action. A mitigation action may include, but is not limited to, terminating any connection to the vulnerable wireless device 110, e.g., terminating a connection to an access point.

In an embodiment, upon detection of a vulnerable wireless device 110, an alert is generated, displayed, or otherwise reported to a user of the security system 150. In some example embodiments, an event indicating a detection of a vulnerable wireless network 110 is generated and sent to an external system (e.g., a SIEM system).

It should be appreciated that the embodiments disclosed herein are not limited to the specific architecture illustrated in FIG. 1 and that other architectures may be used without departing from the scope of the disclosed embodiments. Specifically, in an embodiment, there may be a plurality of security systems 150 operating as described hereinabove and configured to either have one as a standby, to share loads between them, or to split the functions between them. Furthermore, in a typical wireless environment 100 or a typical deployment, there will be a plurality of internal networks 130 which can co-exist, i.e., a single network 130 is shown in FIG. 1 merely for the purpose of simplicity of discussion. It should be further noted that, in some configurations, one or more sensors 140 can be embedded in the security system 150.

Figure 3:
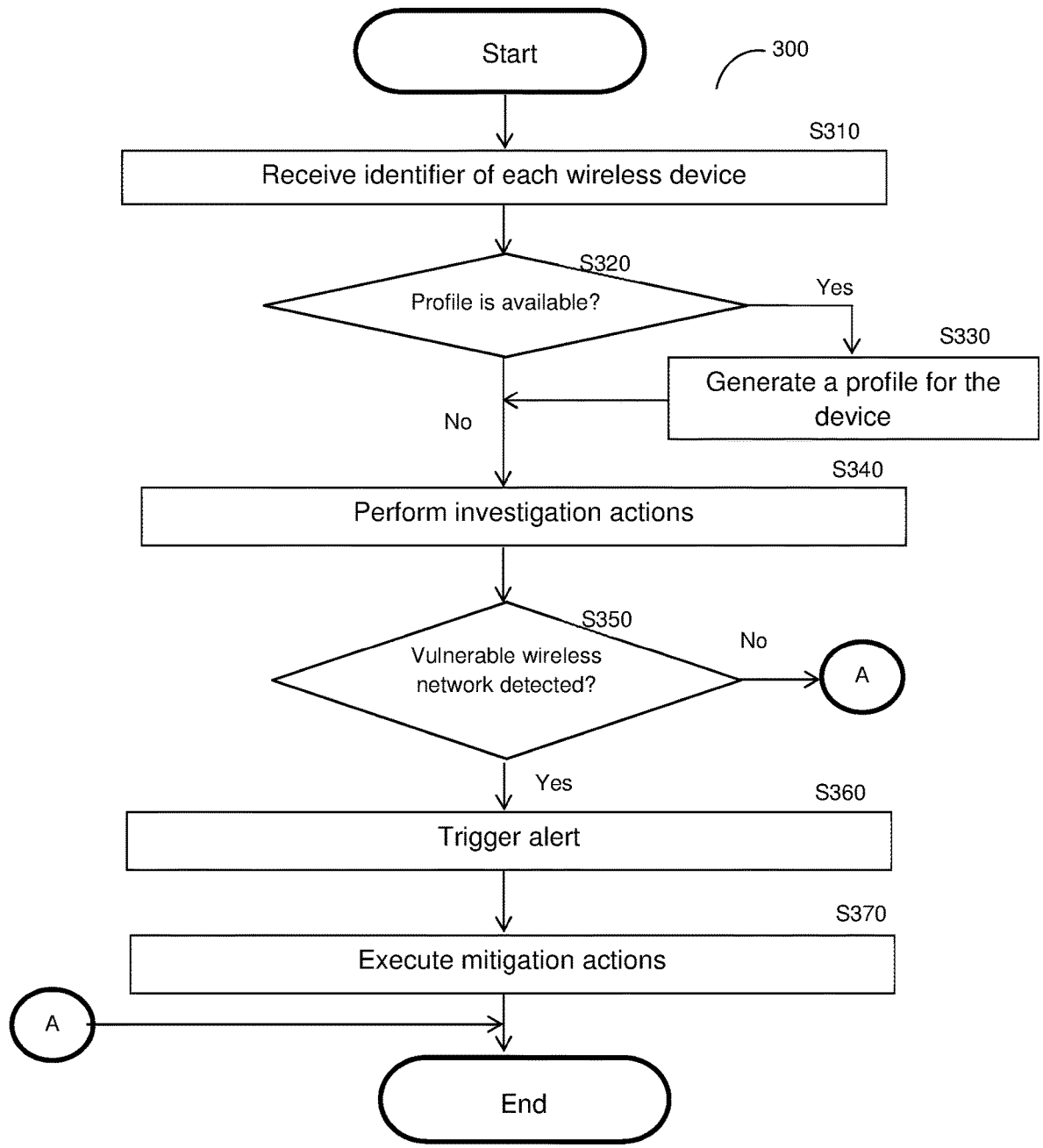
FIG. 3 is a flowchart illustrating a method for detecting vulnerable wireless device according to an embodiment.

FIG. 3 shows an example flowchart 300 illustrating a method for detecting a vulnerable wireless device in a wireless environment according to an embodiment.

At S310, an identifier of each wireless device identified in the wireless environment is received. The wireless devices can be identified, for example, by a network address (e.g., MAC) or by another device identifier. The identifiers can be received, for example, for the sensors installed in the wireless device.

At S320, for each identified wireless device, it is determined if there is any profile associated with the device. In an embodiment, S320 further includes checking if a profile already associated with a device is invalid (e.g., the aging counter has not expired or some attributes are missing). If the wireless device needs to be profiled, then execution continues with S330; otherwise, execution proceeds with S340.

At S330, a profile of each wireless device not yet associated with a profile is generated. The profiling is performed in part based on information received from the sensors 140. The profiling may be performed passively by analyzing protocol data extracted by the sensors 140, processed by the sensors 140, or both. Alternatively or collectively, the profiling may be performed proactively by accessing the device, querying the device, or both. The profiling of the wireless device 110 is discussed in greater detail above.

At S340, one or more investigation actions are performed to determine if each identified wireless device is vulnerable. The operation of S340 is discussed in more detail herein below with respect to FIG. 4.

At S350, it is determined if a vulnerable wireless network is detected based on the analysis performed at S340. If so, execution continues with S360; otherwise, execution terminates.

At S360, an alert indicating the detected vulnerable wireless device is triggered. The alert may designate the wireless device identifier, connections or networks that the device established or participated in the establishment of, a type of detected vulnerably, a combination thereof, and so on. In some configurations, the alert may include a value of the global score that triggered the alert together with the reason or reasons leading to the score. As noted above, this provides the user (e.g., a system administrator) with an additional layer of data, allowing the user track to the cause for the vulnerability, thereby allowing to mitigate any detect vulnerability based on its specific cause or originator.

Optionally, at S370, at least one mitigation action can be executed. For example, the vulnerable wireless network's connection may be terminated.

Figure 4A:
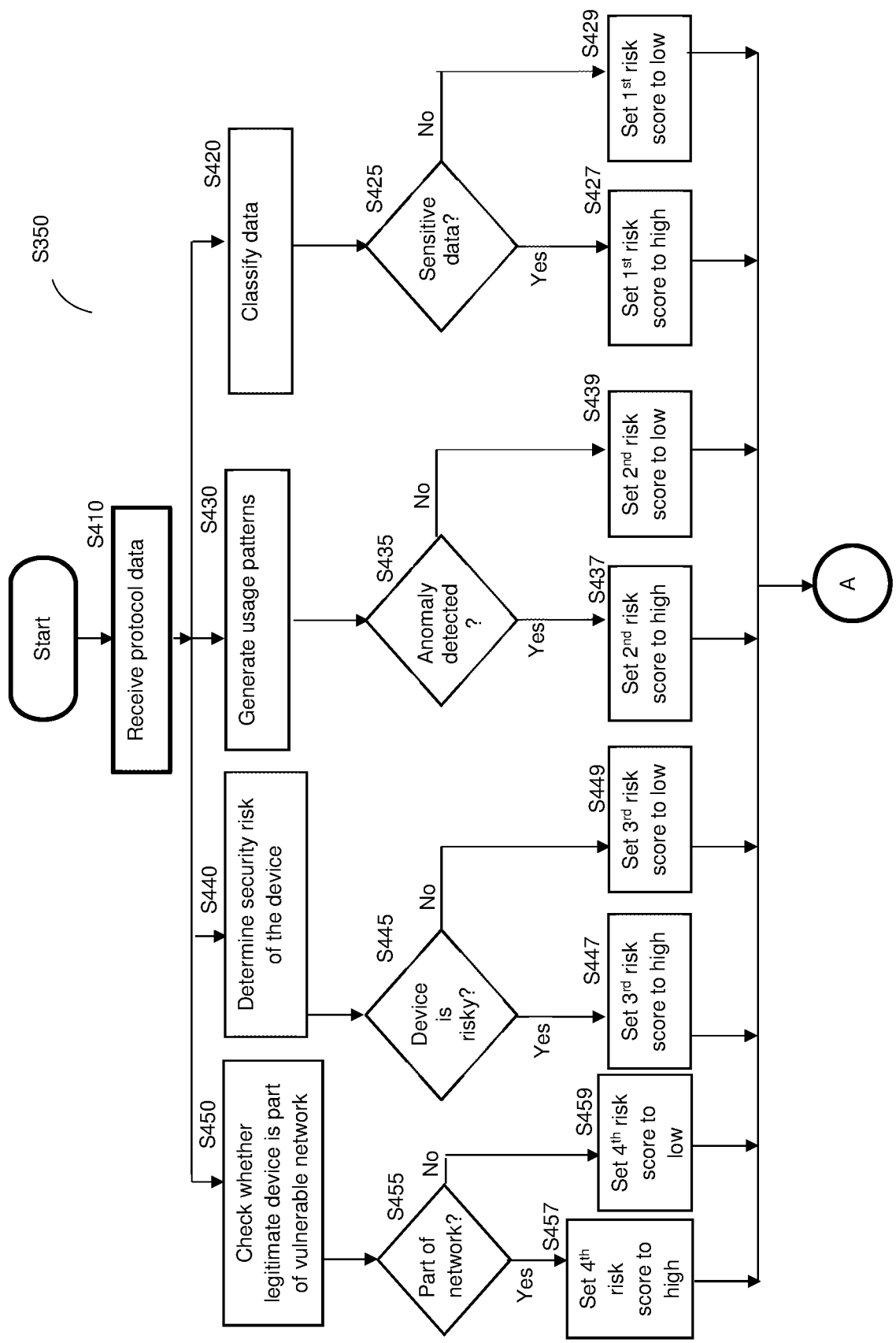
FIGS. 4A and 4B show a flowchart illustrating a method for determining if a wireless device is vulnerable according to an embodiment.
Figure 4B:
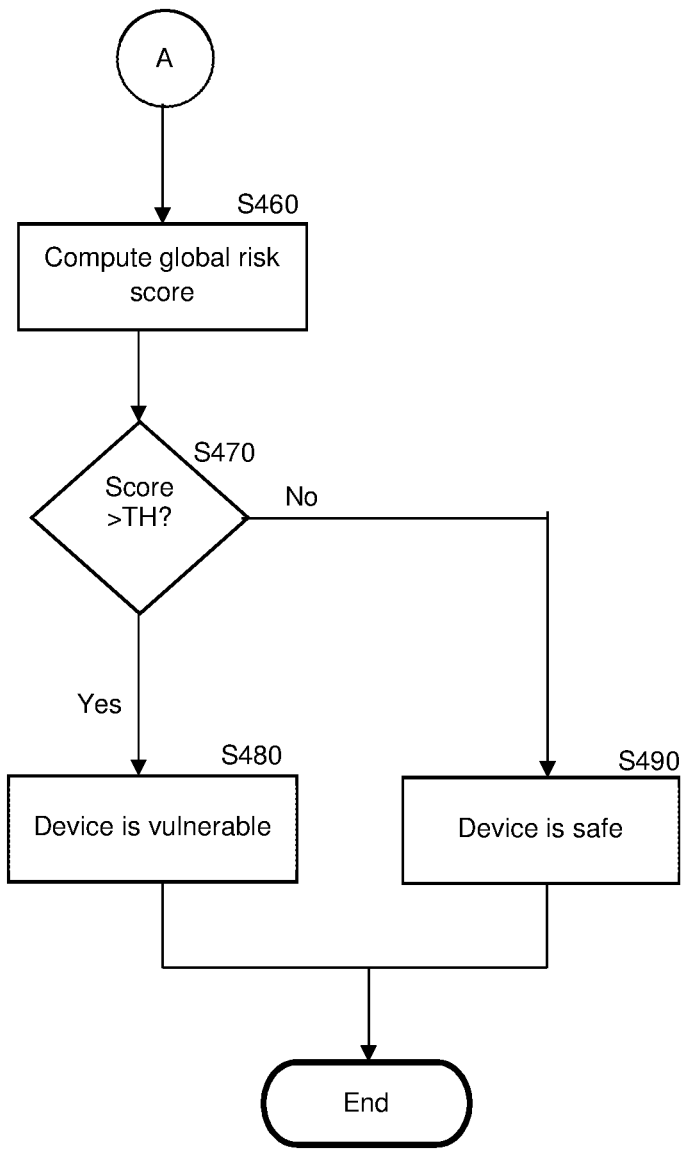

FIGS. 4A and 4B show an example flowchart S350 illustrating a method for determining if a wireless device is vulnerable by investigation action according to an embodiment.

At S410, protocol data extracted by a plurality of sensors is received. In an embodiment, the received protocol-data may include any payload data transmitted over the wireless medium by any wireless device being investigated.

Then, execution proceeds with S420, S430, S440, and S450. The received protocol data can be gathered over a predefined time period, until there is a sufficient amount of data for processing, or both until a predefined time period has passed and a sufficient amount of data has been gathered. In an embodiment, protocol-data is gathered per wireless device. That is, only protocol-data sent or received by a wireless device is classified. It should be noted that the protocol-data may be pushed by the sensors at any time or requested (e.g., from the security system 150) on demand.

At S420, the gathered protocol-data is classified to determine if it contains sensitive information. Such classification can be performed using a DLP service. In an embodiment, another check is made to determine if the gathered protocol-data contains any signature of a known malware. At S425, it is checked if the data is classified as sensitive information or contains malware. If so, at S427, a first risk score is set to a high value; otherwise, at S429, the first risk score is set to a low value. Some examples are provided above.

At S430, one or more usage patterns of traffic from and to the wireless device are generated based on the gathered information. Examples for such usage patterns are provided above. At S435, the generated usage patterns are compared to their respective baselines to detect anomalies in the usage patterns, and it is checked whether any anomalies have been detected. A baseline for a usage pattern can be derived, for example, based on previous communications of the same wireless device; the organization usage of all or similar devices; on similar activity of same device type (if the device is identified using a fingerprint), as recorded in a lab setting, or based on previous observations from other networks.

If at least one anomaly is detected, at S437, a second risk score is set to a high value; otherwise, at S439, the second risk score is set to a low value. Some examples are provided above.

At S440, the profile of a wireless network is analyzed to determine if there is a security risk associated with the respective device. At S445, based on the analysis, it is determined if the device is risky. If the device is determined to be risky, at S447, a third risk factor is set to a high value; otherwise, at S449, the third risk factor is set to a low value. In an embodiment, S440 includes determining if any of the profile's attributes do not comply with a current security standard. For example, if the profile attributes indicate that the OS is not current, then the device is not in compliance with a current security standard, and the device is deemed risky. The current security standard may be determined by a security policy set, for example, by an administrator of the organization.

At S450, it is determined if the wireless device that was designated as legitimate is part of a wireless network that has been determined to be vulnerable. In an embodiment, S450 includes checking if the wireless device bridges between a protected resource and an external resource. At S455, it is checked if the wireless device is part of a vulnerable network and, if so, execution continues with S457; otherwise, execution continues with S459. At S457, a fourth risk score is set to a high value; otherwise, at S459, the fourth risk score is set to a low value. As noted above, the security system 150 is configured to detect and maintain a list of wireless networks in the environment and the devices that form or participate in such networks. It should be node that additional investigation actions may be performed. It should be noted that S420, S430, S440, S450 can be performed in a different order or executed in parallel without departing from the scope of the disclosed embodiments. Further, in some embodiments, only one, some, or all of the investigation actions discussed herein are performed. The selection of investigation actions to be performed may be based on a type of a wireless protocol, a deployment type of sensor, and so on.

At S460 (FIG. 4B), a global risk score is computed as a function of any of the first, second, third, and fourth risk scores. Examples for such a function are provided above.

At S470, it is checked if the global risk score is greater than a predefined threshold. If so, execution continues with S480, where the wireless device is determined as vulnerable; otherwise, at S490, the wireless device is determined as safe.

In an embodiment, the methods discussed with references to FIGS. 3 and 4 are performed by the security system 150 as described in greater detail above.

Figure 5:
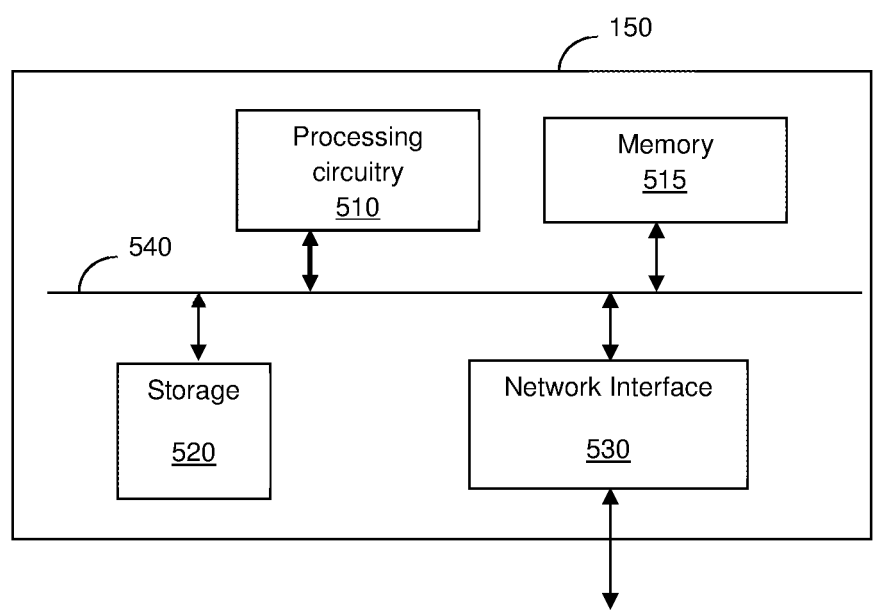
FIG. 5 is a block diagram of a security system according to an embodiment.

FIG. 5 shows an example block diagram of the security system 150 according to an embodiment. The security system 150 includes a processing circuitry 510, a memory 515, a storage 520, and a network interface 530, all connected to a computer bus 540.

The processing circuitry 510 may be realized by one or more hardware logic components and circuits. For example, and without limitation, illustrative types of hardware logic components that can be used include Field Programmable Gate Arrays (FPGAs), Application-specific Integrated Circuits (ASICs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory 515 may be volatile, non-volatile, or a combination thereof. The storage 520 may be magnetic storage, optical storage, and the like.

In one configuration, computer readable instructions to implement one or more embodiments disclosed herein may be stored in the storage 520. The storage 520 may also store other computer readable instructions to implement an operating system, an application program, and the like. Computer readable instructions may be loaded in the memory for execution by the processing circuitry 510. The computer readable instructions, when executed, causes the processing circuitry 510 to perform the process for detecting vulnerable devices as discussed in detailed above.

In another embodiment, the storage 520, the memory 515, or both, are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 510 to perform the various functions described herein with respect to at least detection of vulnerable wireless networks.

According to some embodiments, the storage 520 may be utilized to store the list of legitimate devices, learnt baselines for usage patterns, generated usage patterns, devices' profiles, and so on.

The network interface 530 allows communication with other external systems, the plurality of sensors, and so on. The network interface 530 may include a wired connection or a wireless connection. The network interface 530 may be utilized to transmit communications media, receive communications media, or both. The computer bus 540 may be, for example, a PCIe bus.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detecting vulnerable wireless devices operating in a wireless environment of an organization, comprising:
    identifying a plurality of wireless devices operable in the wireless environment;
    for each identified wireless device:
        receiving intercepted traffic transmitted by the wireless device, wherein the intercepted traffic is transported using at least one type of wireless protocol, wherein the received traffic includes protocol data extracted from a wireless protocol utilized for the transmission by the wireless device;
        generating a profile for each wireless device, wherein each generated profile includes a set of attributes related to the respective wireless device;
        performing at least one security check on each wireless device;
        determining, for each wireless device, if the wireless device is legitimate based on the set of attributes in the profile generated for the wireless device, wherein the at least one security check is performed prior to determining if the wireless device is legitimate, wherein a legitimate wireless device is at least legitimately authorized to access a protected computing resource of the organization;
        analyzing the received traffic to determine if the wireless device is vulnerable, wherein the analysis is performed using at least the profile generated for the wireless device; and
        generating an alert, when it is determined that the wireless device is vulnerable.

2. The method of claim 1, wherein the received traffic is intercepted by a plurality of sensors deployed in the wireless environment.

3. The method of claim 1, wherein the received traffic for each identified wireless device includes at least one of: an indication regarding establishment of a new connection with the wireless device, an indication regarding termination of a connection with the wireless device, an indication regarding existence of an active connection with the wireless device, an indication regarding existence of a wireless device, a networking address of the wireless device, payload data, and existence of payload data.

4. The method of claim 1, wherein generating the profile further comprises: passively identifying at least one attribute of the set of attributes in the protocol-data.

5. The method of claim 1, wherein generating the profile further comprises: proactively querying the wireless device for at least one attribute of the set of attributes.

6. The method of claim 1, wherein the at least one type of wireless protocol includes any one of: Wi-Fi, nRF, long term evolution (LTE), cellular communication protocols, Bluetooth, Wi-Gi, Zigbee, Bluetooth Low Energy (BLE), EnOcean, DECT, 6LoWPAN, and Z-Wave.

7. The method of claim 1, wherein analyzing the received traffic to determine if the wireless device is vulnerable further comprises:
    performing at least one investigation action;
    determining a risk score based on each of the at least one investigation action;
    computing a global risk score based on the determined at least one risk score; and
    determining, based on the computed global risk score, the wireless device is as vulnerable.

8. The method of claim 7, wherein the at least one investigation action includes at least one of: determining if the wireless device is part of a vulnerable wireless network; determining whether the wireless device bridges between the legitimate device and an external resource; detecting at least one anomaly based on a usage pattern of the wireless device; classifying a type of information transmitted or received by the wireless device; and analyzing the device profile to determine a risk associated with the operation of the device.

9. The method of claim 8, further comprising:
    detecting vulnerable wireless networks coexisting in the wireless environment.

10. The method of claim 1, further comprising:
    executing at least one mitigation action, upon determining that the wireless device is vulnerable.

11. A system for detecting vulnerable wireless devices coexisting in a wireless environment of an organization, comprising:
    a processing circuitry; and
    a memory, the memory containing instructions that, when executed by the processing circuitry, configure the system to:
    identify a plurality of wireless devices operable in the wireless environment;
    for each identified wireless device:
        receive intercepted traffic transmitted by the wireless device, wherein the intercepted traffic is transported using at least one type of wireless protocol, wherein the received traffic includes protocol data extracted from a wireless protocol utilized for the transmission by the wireless device;
        generate a profile for each wireless device, wherein each generated profile includes a set of attributes related to the respective wireless device;
        perform at least one security check on each wireless device;
        determine, for each wireless device, if the wireless device is legitimate based on the set of attributes in the profile generated for the wireless device, wherein the at least one security check is performed prior to determining if the wireless device is legitimate, wherein a legitimate wireless device is at least legitimately authorized to access a protected computing resource of the organization;
        analyze the received traffic to determine if the wireless device is vulnerable, wherein the analysis is performed using at least the profile generated for the wireless device; and
        generate an alert, when it is determined that the wireless device is vulnerable.

12. The system of claim 11, wherein the received traffic is intercepted by a plurality of sensors deployed in the wireless environment.

13. The method of claim 11, wherein the received traffic for each identified wireless device includes at least one of: an indication regarding establishment of a new connection with the wireless device, an indication regarding termination of a connection with the wireless device, an indication regarding existence of an active connection with the wireless device, an indication regarding existence of a wireless device, a networking address of the wireless device, payload data, and existence of payload data.

14. The system of claim 11, wherein the system is further configured to: passively identify at least one attribute of the set of attributes in the protocol-data.

15. The system of claim 11, wherein the system is further configured to: proactively query the wireless device for at least one attribute of the set of attributes.

16. The system of claim 11, wherein the at least one type of wireless protocol includes any one of: Wi-Fi, nRF, long term evolution (LTE), cellular communication protocols, Bluetooth, Wi-Gi, Zigbee, Bluetooth Low Energy (BLE), EnOcean, DECT, 6LoWPAN, and Z-Wave.

17. The system of claim 11, wherein the system is further configured to:
perform at least one investigation action;
determine a risk score based on each of the at least one investigation action;
compute a global risk score based on the determined at least one risk score; and
determine, based on the computed global risk score, the wireless device is as vulnerable.

18. The system of claim 17, wherein the at least one investigation action includes at least one of: determining if the wireless device is part of a vulnerable wireless network; determining whether the wireless device bridges between the legitimate device and an external resource; detecting at least one anomaly based on a usage pattern of the wireless device; classifying a type of information transmitted or received by the wireless device; and analyzing the device profile to determine a risk associated with the operation of the device.

19. The system of claim 18, wherein the system is further configured to:
detect vulnerable wireless networks coexisting in the wireless environment.

20. The system of claim 11, wherein the system is further configured to:
execute at least one mitigation action, upon determining that the wireless device is vulnerable.

21. A non-transitory computer readable medium having stored thereon instructions for causing one or more processing units to execute a process for detecting vulnerable wireless devices coexisting in a wireless environment of an organization, the process comprising:
identifying a plurality of wireless devices operable in the wireless environment;
for each identified wireless device:
receiving intercepted traffic transmitted by the wireless device, wherein the intercepted traffic is transported using at least one type of wireless protocol, wherein the received traffic includes protocol data extracted from a wireless protocol utilized for the transmission by the wireless device;
generating a profile for each wireless device, wherein each generated profile includes a set of attributes related to the respective wireless device;
performing at least one security check on each wireless device;
determining, for each wireless device, if the wireless device is legitimate based on the set of attributes in the profile generated for the wireless device, wherein the at least one security check is performed prior to determining if the wireless device is legitimate, wherein a legitimate wireless device is at least legitimately authorized to access a protected computing resource of the organization;
analyzing the received traffic to determine if the wireless device is vulnerable, wherein the analysis is performed using at least the profile generated for the wireless device; and
generating an alert, when it is determined that the wireless device is vulnerable.

* * * * *